United States Patent Office 3,799,887

Patented Mar. 26, 1974

3,799,887

PERIPHERAL IMPREGNATION OF CATALYST SUPPORT MATERIAL

John F. Brennan, Des Plaines, Ill., assignor to Universal Oil Products Company, Des Plaines, Ill.

No Drawing. Filed Sept. 27, 1971, Ser. No. 184,199
Int. Cl. B01j *11/06, 11/32*
U.S. Cl. 252—463 5 Claims

ABSTRACT OF THE DISCLOSURE

A porous catalyst base or support material, for example alumina, is initially saturated with a polymerizable hydrocarbon, for example styrene, which is thereafter polymerized. Subsequent impregnation of the support with catalytic materials is thus restricted to the peripheral surface thereof. The impregnated support is subsequently calcined whereby the hydrocarbon polymer is depolymerized and separated therefrom.

Gaseous waste products resulting from the burning or combustion of hydrocarbonaceous fuels, such as gasoline and fuel oils, comprise carbon monoxide, hydrocarbons and oxides of nitrogen as products of combustion or incomplete combustion and pose a serious health problem with respect to pollution of the atmosphere. While exhaust gases from other hydrocarbonaceous fuel burning sources such as stationary engines, industrial furnaces, etc., contribute substantially to the air pollution problem, the exhaust gases of automobile internal combustion engines are a principal source of pollution. In recent years, with the increasing number of automobiles, the discharge of waste products therefrom has caused considerable alarm, particularly in urban areas, and the control thereof has become exceedingly important.

Of the various methods which have been proposed, the incorporation of a catalytic converter in the exhaust system holds the most promise of meeting the increasingly rigid standards established by government health agencies. A wide variety of metals and metal oxides, either alone or in combination and supported on a refractory porous carrier material, have been recognized for their ability to catalyze the conversion of carbon monoxide, hydrocarbons and/or oxides of nitrogen occurring in automobile exhaust gases. In particular, copper oxide or copper oxide promoted with one or more other metal oxides including iron, cobalt and vanadium oxides supported on a porous alumina carrier material have been shown to be effective to catalyze the desired conversion reactions.

In treating the hot exhaust gases of an internal combustion engine by passing said gases in contact with the particulate catalyst comprising a catalytically active metallic component distributed over the total surface of a porous support, suitable contact of the gaseous stream with said component other than that which is dispersed on the peripheral surface of the support is somewhat precluded by the extremely high velocities of the gaseous exhaust stream. In the manufacture of an exhaust gas conversion catalyst comprising a porous support, it is therefore desirable to effect a distribution of substantially all of the catalytically active metallic component on the peripheral surface of the support whereby full utilization of said component is realized.

Thus, in one of its broad aspects, the present invention embodies a method of catalyst manufacture which comprises (a) initially impregnating a porous carrier material with a polymerizable organic compound; (b) washing the peripheral surface of said carrier material substantially free of said compound; (c) effecting polymerization of said compound retained in said porous carrier material; (d) impregnating the carrier material with a thermally decomposable precursor compound of said metallic component and effecting thermal decomposition thereof in an inert atmosphere; and (e) calcining the resulting composite in an oxidizing atmosphere effecting depolymerization of the polymer retained in the porous carrier material.

In accordance with the method of this invention, a porous carrier material is initially impregnated with a polymerizable organic compound. Preferably, the selected organic compound is a normally liquid compound in which the carrier material can be immersed pursuant to conventional impregnating techniques. However, normal gaseous compounds such as ethylene, propylene, butadiene, and the like, can be utilized provided the impregnation is effected at superatmospheric pressures. Readily polymerizable organic compounds such as styrene, p-methylstyrene, acrylic acid, methylmethacrylate, and the like, which yield heat decomposable polymers which, upon depolymerization, leave a minimum of residue are particularly suitable. For example, styrene is readily polymerized utilizing a polymerization initiator such as benzoyl peroxide. This combination is particularly suitable since neither the polystyrene polymer nor the benzoyl peroxide initiator leave any appreciable residue on subsequent thermal decomposition. The polymerizable organic compound need not necessarily be a monomer but may be an adsorbable liquid resin incorporated in the carrier material and thereafter cross-linked after a rinse operation by heat and pressure, with or without a homogeneous catalyst of an acidic, alkaline or free radical nature.

The method of this invention is useful in conjunction with any of the various and well-known solid adsorbent materials generally utilized as a catalyst support or carrier. Said adsorbent materials include the various charcoals produced by the destructive distillation of wood, peat, lignite, nutshells, bones and other carbonaceous matter, and preferably such charcoals as have been heat treated, or chemically treated, or both, to form a highly porous particle structure of increased adsorbent capacity, and generally defined as activated carbon. Said adsorbent materials also include the naturally occurring clays and silicates, for example diatomaceous earth, fuller's earth, kieselguhr, Attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. The preferred porous carrier materials for use in the present invention are the refractory inorganic oxides, particularly alumina. It is preferred to employ a porous, adsorptive, high surface area material characterized by a surface area of from about 25 to about 500 square meters per gram. Suitable aluminas thus include gamma-alumina, eta-alumina, and theta-alumina, with the first mentioned gamma-alumina being preferred. A particularly preferred alumina is gamma-alumina characterized by an apparent bulk density of from about 0.30 to about 0.70 gm./cc., an average pore diameter of from about 50 to about 150 angstroms, an average pore volume of from about 0.10 to about 1.0 cc./gm., and a surface area of from about 150 to about 500 square meters/gm.

The alumina employed may be a naturally occurring alumina or it may be synthetically prepared by any conventional or otherwise convenient method. The alumina is typically employed in a shape or form determinative of the shape or form of the final catalyst composition, e.g., spheres, pills, granules, extrudates, powder, etc. A particularly preferred form of alumina is the sphere, especially alumina spheres prepared substantially in accordance with the oil-drop method described in U.S. Pat. No. 2,620,314. Briefly, said method comprises dispersing droplets of an alumina sol in a hot oil bath. The droplets are retained in the oil bath until they set into firm gel spheroids. The spheroids are continuously separated from the bath and subjected to specific aging treatments to promote certain desirable properties. The spheres are subsequently dried at about 105° to about 395° F. and thereafter calcined at from about 800° to about 1400° F.

Prior to polymerization of the organic compound, the peripheral surface of the carrier material is washed substantially free thereof, for example, by dipping the carrier material one or more times in a suitable solvent such as n-pentane or the like. The surface washing is suitably effected in a matter of seconds, the exact time being dependent on the desired depth of peripheral impregnation.

Pursuant to the present invention, the porous carrier material, with substantially all save the peripheral surface area thereof occupied by a polymeric material, is impregnated with a thermally decomposable precursor compound of a desired catalytically active metallic component. Thus, where the desired catalytically active metallic component is copper, the carrier material is suitably treated in contact with an aqueous solution of cupric chloride, cupric nitrate, cupric sulfate, and the like. In like manner, the thermally decomposable precursor compounds of other desirable metal components are deposited on the carrier material from a suitable aqueous solution upon contact therewith—the nitrates, sulfates, and chlorates of the aforementioned iron, nickel, cobalt, chromium, manganese, tin and vanadium being generally suitable in aqueous solution.

The composite comprising a thermally decomposable compound impregnated on the peripheral surface thereof is preferably heat treated to decompose said compound in an inert atmosphere at a temperature which, while effecting a desired decomposition, will not disturb the polymer plug. In this manner, the carrier material may be subjected to multiple impregnations to deposit one or more catalytically active components on the peripheral surface in a desired concentrations. In any case, the impregnated composite is subsequently dried and calcined in an oxidizing atmosphere whereby the polymer plug is depolymerized and eluted from the catalyst composite. It will be appreciated that the temperature employed to decompose the precursor compound and to depolymerize the polymer will vary with the particular precursor compound and polymer employed.

The following example is presented in illustration of one preferred embodiment of this invention and is not intended as an undue limitation on the generally broad scope of the invention as set out in the appended claims.

EXAMPLE

About 1500 cc. of 3 mm. O.D. alumina spheres with an average bulk density of 0.45 gms./cc. were soaked in 1550 cc. of styrene containing 90 gms. of benzoyl peroxide. The alumina spheres were osaked for about one minute and thereafter dipped in n-pentane for 20 seconds to remove styrene from the peripheral surface thereof. The styrene-imprengated alumina spheres were then sealed in a glass lined autoclave under one atmosphere of nitrogen and heated for one hour at 212° F. The resulting polystyrene impregnated spheres were heated in a rotary steam evaporator until they were free-flowing and thereafter immersed in a common aqueous solution of cupric nitrate and ferric nitrate. The spheres recovered from the copper and iron nitrate solution were dried and heated to about 400° F. in a nitrogen atmosphere to decompose the nitrates. The cupric and ferric nitrate treatment was then repeated to deposit about 2.0% copper and about 1.7% iron, calculated as the oxides, in the alumina. The polystyrene contained in the spheres was subsequently depolymerized by calcining the spheres in air at 500° F. The catalyst product contained the copper and iron components dispersed in the peripheral surface of the 3 mm. O.D. alumina spheres to a depth of about 0.2 mm.

I claim as my invention:

1. In the preparation of a catalytic composite including the step of impregnating a refractory inorganic oxide porous carrier material with a catalytically active metallic component selected from the group consisting of iron, nickel, cobalt, chromium, manganese, tin and vanadium, the improvement and method of effecting said impregnation whereby said component is dispersed on the peripheral surface of said carrier material which comprises:

(a) initially impregnating said refractory inorganic oxide porous carrier material with a polymerizable hydrocarbon;
(b) washing the peripheral surface of said carrier material substantially free of said hydrocarbon;
(c) effecting polymerization of said hydrocarbon retained in said porous carrier material;
(d) impregnating the carrier material with a thermally decomposable precursor compound of said metallic component and thereafter effecting thermal decomposition thereof in an inert atmosphere; and
(e) calcining the resulting composite in an oxidizing atmosphere effecting depolymerization of the hydrocarbon polymer retained in the porous carrier material.

2. The method of claim 1 further characterized in that said porous carrier material is alumina.

3. The method of claim 1 further characterized in that said polymerizable hydrocarbon is styrene.

4. The method of claim 1 further characterized in that said catalytically active metallic component comprises copper, and said thermally decomposable compound is copper nitrate.

5. The method of claim 1 further characterized in that said catalytically active metallic component comprises copper and iron, and said thermally decomposable compound is a nitrate thereof.

References Cited

UNITED STATES PATENTS

| | | | |
|---|---|---|---|
| 1,390,683 | 9/1921 | Ellis | 252—430 |
| 2,842,504 | 7/1958 | Jones | 252—430 |
| 2,887,471 | 5/1959 | Shearer et al. | 252—430 X |
| 2,952,643 | 9/1960 | Voge | 252—430 |
| 2,976,253 | 3/1961 | Edwards | 252—430 |
| 3,018,255 | 1/1962 | Banks | 252—430 |
| 3,136,729 | 6/1964 | Clark | 252—430 X |
| 3,354,235 | 11/1967 | Hogan et al. | 252—430 X |
| 3,389,092 | 6/1968 | Sanford et al. | 252—430 |
| 3,484,428 | 12/1969 | Kallenback | 252—430 X |
| 3,562,351 | 2/1971 | Mertzweiller | 252—430 X |
| 2,643,980 | 6/1953 | Houdry | 252—466 J |
| 2,746,936 | 5/1956 | Plank | 252—465 |
| 3,377,269 | 4/1968 | Bloch | 252—463 X |
| 3,467,602 | 9/1969 | Koester | 252—463 X |

CARL F. DEES, Primary Examiner

U.S. Cl. X.R.

252—464, 465, 466 J, 477 R